(12) United States Patent
Montelongo et al.

(10) Patent No.: US 9,063,269 B1
(45) Date of Patent: Jun. 23, 2015

(54) MAGNIFYING DEVICE

(71) Applicants: Ricardo Montelongo, Pembroke Pines, FL (US); Jessica Echeverri, Pembroke Pines, FL (US)

(72) Inventors: Ricardo Montelongo, Pembroke Pines, FL (US); Jessica Echeverri, Pembroke Pines, FL (US)

( * ) Notice: Subject to any disclaimer, the term of this patent is extended or adjusted under 35 U.S.C. 154(b) by 0 days.

(21) Appl. No.: 14/084,848

(22) Filed: Nov. 20, 2013

(51) Int. Cl.
*G02B 7/02* (2006.01)
*G02B 27/02* (2006.01)
*B43K 29/00* (2006.01)

(52) U.S. Cl.
CPC ...... *G02B 7/02* (2013.01); *G02B 27/02* (2013.01); *B43K 29/003* (2013.01); *G02B 7/023* (2013.01)

(58) Field of Classification Search
CPC ............ G02B 7/00; G02B 7/02; G02B 7/023; G02B 27/00; G02B 27/02; G02B 27/021; G02B 27/022; B43K 29/003
USPC .................. 359/802, 809, 811, 817
See application file for complete search history.

(56) References Cited

U.S. PATENT DOCUMENTS

| | | | |
|---|---|---|---|
| 2,732,761 A | 1/1956 | Bender et al. | |
| 4,178,071 A * | 12/1979 | Asbell | 359/442 |
| 4,398,800 A | 8/1983 | Hayes | |
| 5,074,695 A | 12/1991 | DeRosa | |
| 6,113,295 A | 9/2000 | Bordelon | |
| 6,135,661 A | 10/2000 | Houser | |
| D558,826 S | 1/2008 | Tam | |
| 7,471,467 B1 | 12/2008 | Kalwa et al. | |
| 7,567,394 B1 | 7/2009 | Monte | |
| D598,952 S | 8/2009 | Kushner | |
| 7,839,035 B2 * | 11/2010 | Hwaung | 310/76 |
| D648,383 S | 11/2011 | Armstead | |
| 2012/0268838 A1 * | 10/2012 | Rittenburg et al. | 359/802 |

* cited by examiner

*Primary Examiner* — Loha Ben

(57) ABSTRACT

A magnifying device provides magnification as needed for an electronic display screen. The device includes an elongated housing having a first end, a second end, and a perimeter wall extending between the first end and the second end. A longitudinal slot extends through the perimeter wall. A reel is coupled to and positioned in the housing. A panel has a first edge coupled to the reel. The panel extends through the slot such that the panel is selectively extendable from the housing. The panel magnifies an image when the image is viewed through the panel.

7 Claims, 4 Drawing Sheets

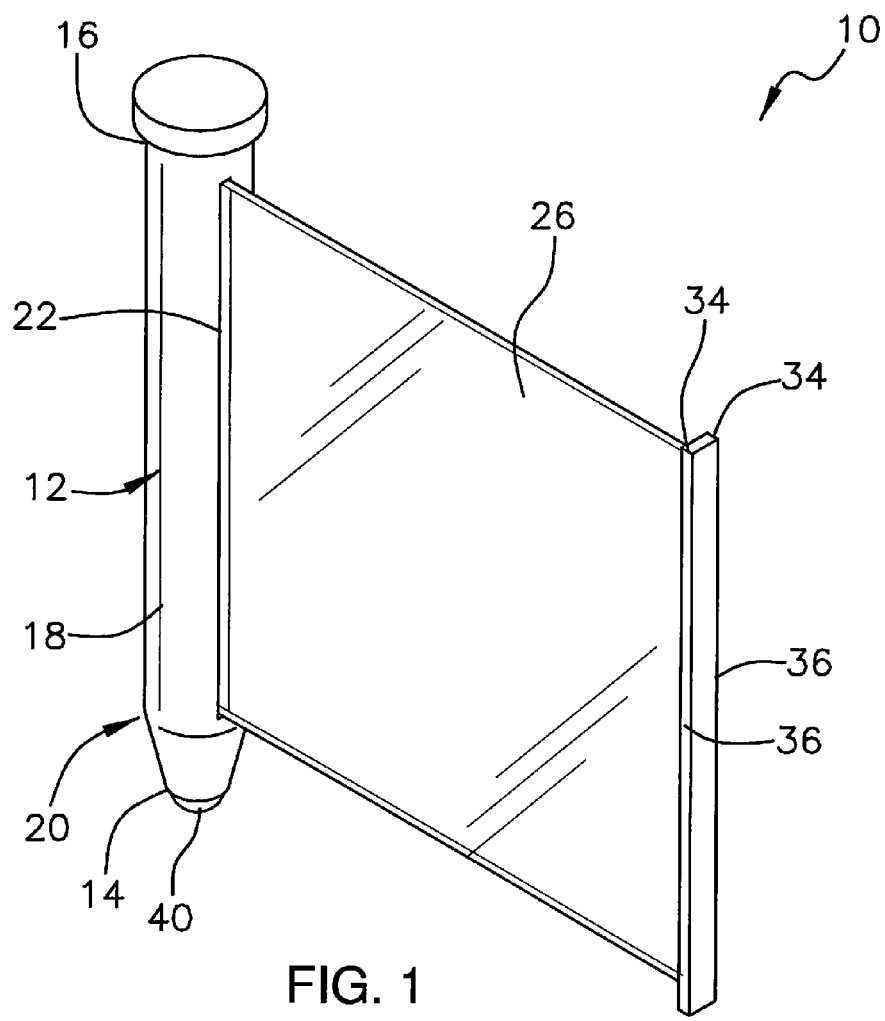
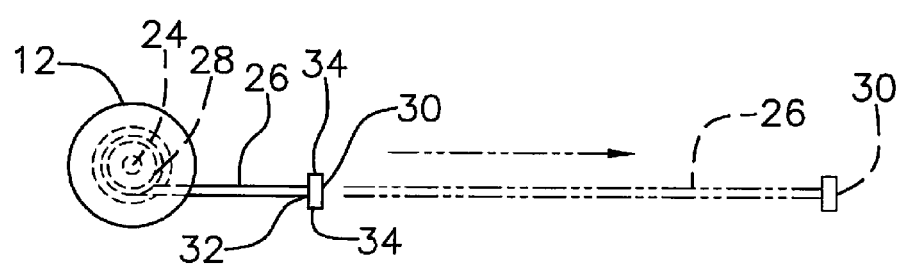

MAGNIFYING DEVICE

BACKGROUND OF THE DISCLOSURE

Field of the Disclosure

The disclosure relates to magnification devices and more particularly pertains to a new magnification device for providing magnification as needed for an electronic display screen.

SUMMARY OF THE DISCLOSURE

An embodiment of the disclosure meets the needs presented above by generally comprising an elongated housing having a first end, a second end, and a perimeter wall extending between the first end and the second end. A longitudinal slot extends through the perimeter wall. A reel is coupled to and positioned in the housing. A panel has a first edge coupled to the reel. The panel extends through the slot such that the panel is selectively extendable from the housing. The panel magnifies an image when the image is viewed through the panel.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 1 is a top front side perspective view of a magnifying device according to an embodiment of the disclosure.

FIG. 2 is a top view of an embodiment of the disclosure.

DESCRIPTION OF THE PREFERRED EMBODIMENT

Figure 3:
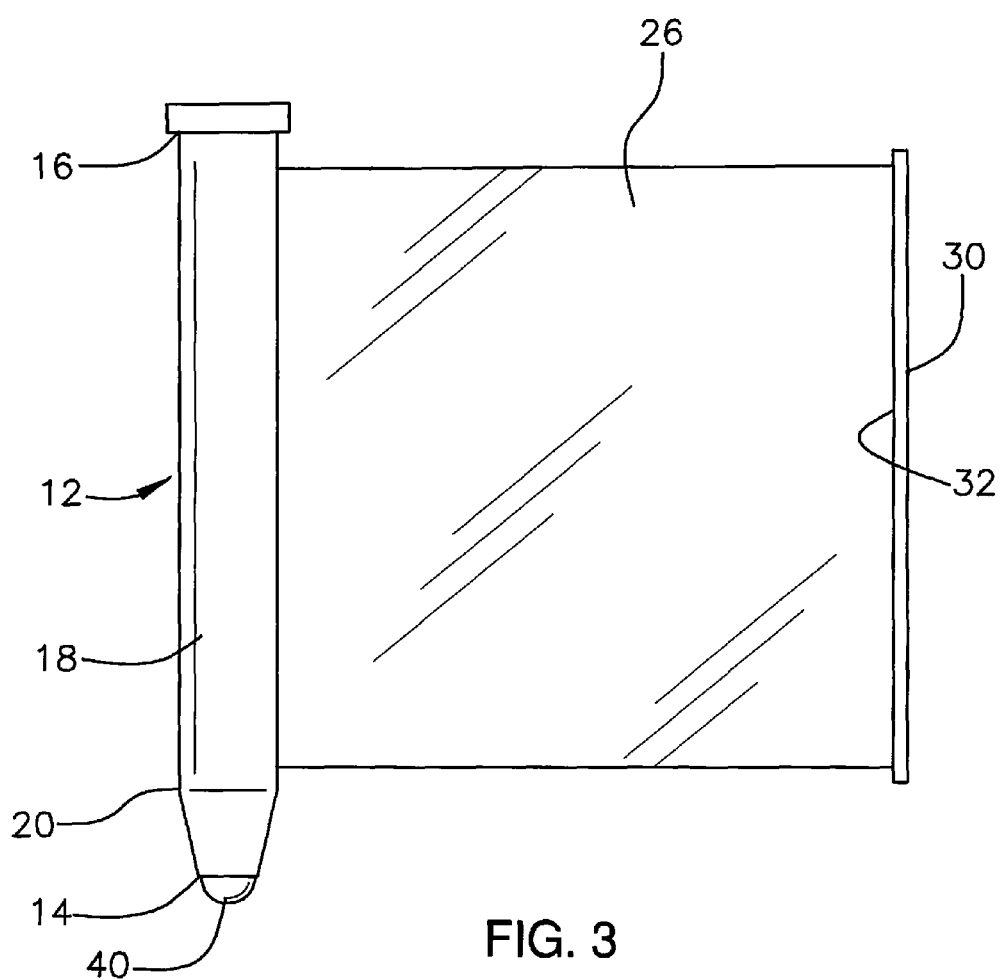
FIG. 3 is a front view of an embodiment of the disclosure.

With reference now to the drawings, and in particular to FIGS. 1 through 6 thereof, a new magnification device embodying the principles and concepts of an embodiment of the disclosure and generally designated by the reference numeral 10 will be described.

As best illustrated in FIGS. 1 through 6, the magnifying device 10 generally comprises an elongated housing 12 having a first end 14, a second end 16, and a perimeter wall 18 extending between the first end 14 and the second end 16. The perimeter wall 18 of the housing 12 may taper from a medial point 20 between the first end 14 and the second end 16 extending towards the first end 14 of the housing 12. A tip 40 may be coupled to the first end 14 of the housing 12. The tip 40 is convexly arcuate such that the housing 12 may define a stylus for use with a conventional electronic device utilizing a stylus for control input. A longitudinal slot 22 extends through the perimeter wall 18. A reel 24 of conventional design is coupled to the housing 12. The reel 24 is positioned in the housing 12 and aligned with the slot 22. A transparent panel 26 has a first edge 28 coupled to the reel 24. The panel 26 extends through the slot 22 wherein the panel 26 is selectively extendable from the housing 12 through the slot 22. The panel 26 is structured such that the panel 26 magnifies an image when the image is viewed through the panel 26. Thus, the housing 12 may be positioned adjacent to an object and the object can be viewed under magnification by extending the panel 26 from the housing 12 and viewing the object through the panel 24. The reel 24 may be biased in conventional fashion such that the reel 24 urges the panel 26 to be withdrawn into the housing 12. The reel 24 may incorporate conventional mechanisms such as those found in window blinds to permit the panel 26 to remain in an extended or partially extended position until the reel 24 is actuated to retract the panel 26 by pulling on and releasing the panel 26.

A stop 30 is coupled to the panel 26 opposite the first edge 28 wherein the panel 26 is prevented from being retracted fully into the housing 12. The stop 30 may be coupled to a distal edge 32 of the panel 26 relative to the reel 24. The stop 30 may extend a full length along the distal edge 32 of the panel 26. The stop 30 may further be elongated having outer sections 34 extending outwardly from the distal edge 32 of the panel 26. The stop 30 may further have longitudinal sides 36 extending from the distal edge 32 of the panel 26 to facilitate grasping and pulling of the panel 26 from the housing 12.

In use, the device 10 may be used as a conventional stylus. When desired, the stop 30 may be grasped and pulled to extend the panel 26 from the housing 12 permitting viewing of an object through the panel 26 wherein the object is magnified. The stop 30 may then be released to allow the panel 26 to be retracted into the housing 12 for storage until needed again.

Figure 4:
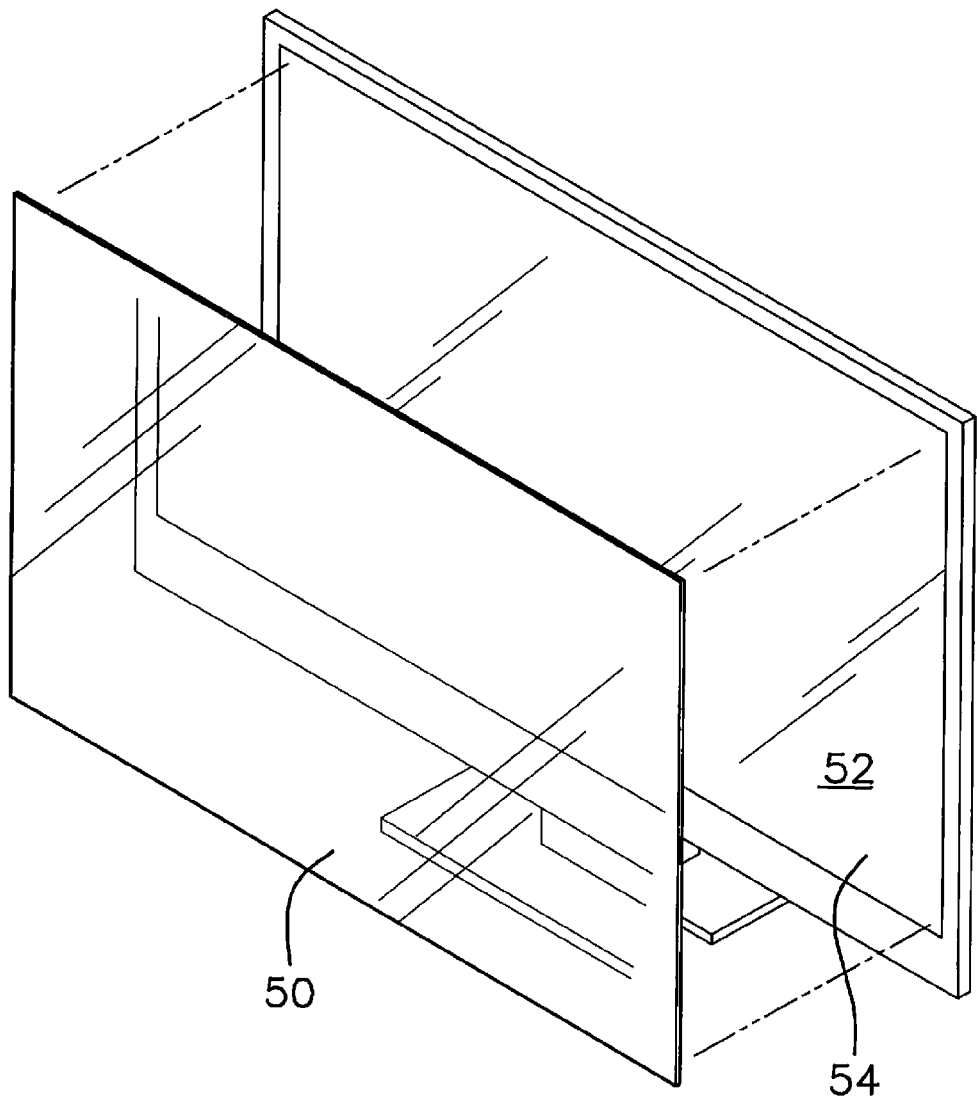
FIG. 4 is a top front side perspective view of an embodiment of the disclosure.
Figure 5:
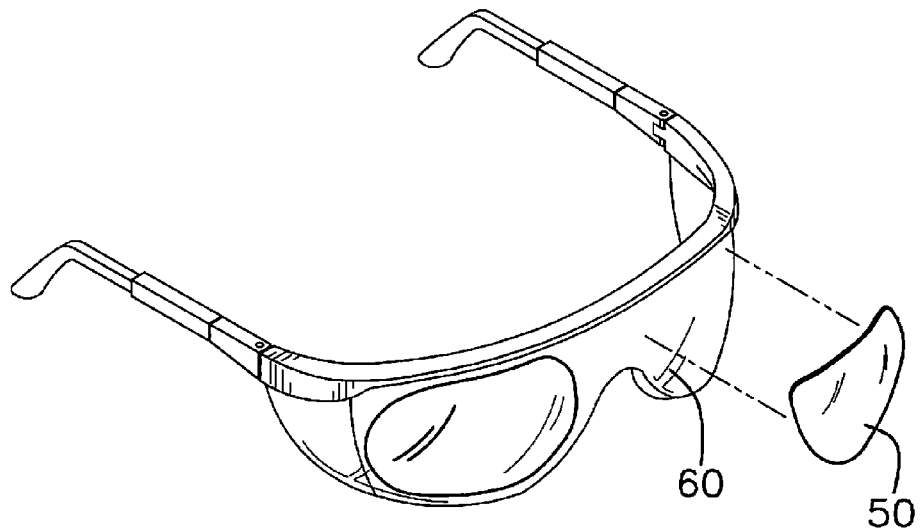
FIG. 5 is a top front side perspective view of an embodiment of the disclosure.
Figure 6:
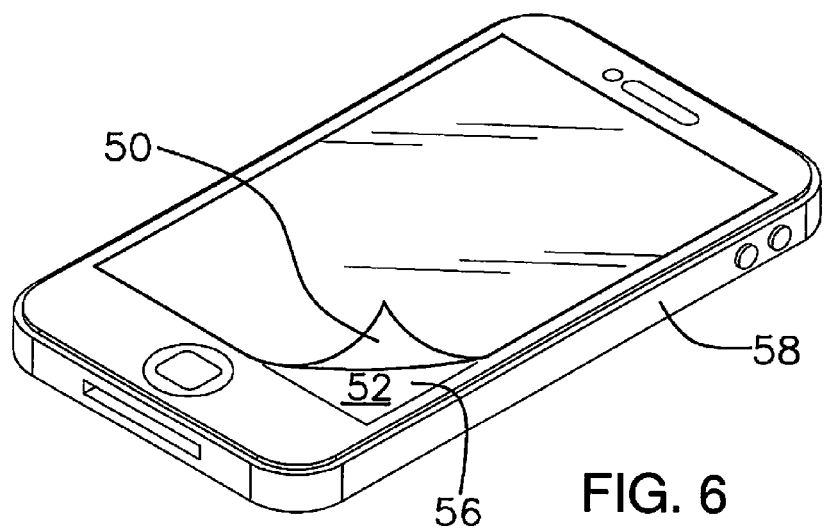
FIG. 6 is a top front side perspective view of an embodiment of the disclosure.

In alternative embodiments of the invention displayed in FIGS. 4 and 6, a sheet of magnifying material 50 may be applied directly to a surface 52 such as a monitor screen 54 or a display screen 56 of a hand held unit 58 to provide some degree of magnification. In FIG. 5, the sheet of magnifying material 50 may be applied to goggles 60 such that the material 50 provides magnification when viewing objects through the goggles 60.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

We claim:

1. A magnifying device comprising:
 an elongated housing having a first end, a second end, and a perimeter wall extending between said first end and said second end, said perimeter wall of said housing tapering and extending towards said first end of said housing;
 a longitudinal slot extending through said perimeter wall;
 a reel coupled to said housing, said reel being positioned in said housing;
 a panel having a first edge coupled to said reel, said panel extending through said slot wherein said panel is selectively extendable from said housing, said panel magnifying an image when the image is viewed through said panel.

2. The device of claim 1, further comprising a stop coupled to said panel wherein said panel is prevented from being retracted fully into said housing.

3. The device of claim 2, wherein said stop is coupled to a distal edge of said panel relative to said reel.

4. The device of claim 3, wherein said stop is elongated, said stop extending a full length along said distal edge of said panel.

5. The device of claim 1, further comprising a tip coupled to said first end of said housing.

6. The device of claim 5, wherein said tip is convexly arcuate.

7. A magnifying device comprising:
 an elongated housing having a first end, a second end, and a perimeter wall extending between said first end and said second end, said perimeter wall of said housing tapering and extending towards said first end of said housing;
 a longitudinal slot extending through said perimeter wall;
 a reel coupled to said housing, said reel being positioned in said housing;
 a panel having a first edge coupled to said reel, said panel extending through said slot wherein said panel is selectively extendable from said housing, said panel magnifying an image when the image is viewed through said panel;
 a stop coupled to said panel wherein said panel is prevented from being retracted fully into said housing, said stop being coupled to a distal edge of said panel relative to said reel, said stop being elongated, said stop extending a full length along said distal edge of said panel; and
 a tip coupled to said first end of said housing, said tip being convexly arcuate.

* * * * *